United States Patent [19]

Togami

[11] Patent Number: 5,581,568

[45] Date of Patent: Dec. 3, 1996

[54] DATA DETECTION APPARATUS

[75] Inventor: Mikio Togami, Kawasaki, Japan

[73] Assignee: Canon Kabushiki Kaisha, Tokyo, Japan

[21] Appl. No.: 517,195

[22] Filed: Aug. 21, 1995

Related U.S. Application Data

[63] Continuation of Ser. No. 76,779, Jun. 15, 1993.

[30] Foreign Application Priority Data

Jun. 18, 1992 [JP] Japan ................................ 4-159769

[51] Int. Cl.$^6$ .................... G06F 11/10; H03M 13/12; H04N 9/79
[52] U.S. Cl. .................... 371/43; 375/341; 386/113
[58] Field of Search .......................... 375/341, 348; 358/327, 330, 335

[56] References Cited

U.S. PATENT DOCUMENTS

| | | | |
|---|---|---|---|
| 4,606,027 | 8/1986 | Otani | 371/43 |
| 4,847,871 | 7/1989 | Matsushita et al. | 375/341 |
| 4,852,034 | 7/1989 | Takayama | 364/724.01 |
| 5,089,917 | 2/1992 | Kanota et al. | 371/43 |
| 5,099,366 | 3/1992 | Ahlgrim | 360/67 |
| 5,258,940 | 11/1993 | Coker et al. | 364/724.01 |
| 5,287,385 | 2/1994 | Sugawara et al. | 371/43 |
| 5,400,149 | 3/1995 | Minakawa | 358/327 |

OTHER PUBLICATIONS

"Application of Partial–Response Channel Coding to Magnetic Recording Systems"; by H. Kobayashi et al.; IBM Journal of research and development vol. 14, No. 4, pp. 368–375, Jul. 1970.

"The Viterbi Algorithm" by G. David Forney, Jr.; Proceedings of the IEEE; Mar. 1973; vol. 61, No. 3; pp. 268–278.

Primary Examiner—Roy N. Envall, Jr.
Assistant Examiner—Emmanuel L. Moise
Attorney, Agent, or Firm—Fitizpatrick, Cella, Harper & Scinto

[57] ABSTRACT

A data detection apparatus has an A/D (analog to digital) converter which samples and quantizes the output of a low-frequency-emphasizing-type equalization circuit and a digital filter which processes the output of the A/D converter. A Viterbi decoder performs Viterbi decoding of the digital output filter and determines a branchmetric on the basis of an equalization error.

10 Claims, 2 Drawing Sheets

DATA DETECTION APPARATUS

This application is a continuation of application Ser. No. 08/076,779, filed Jun. 15, 1993.

BACKGROUND OF THE INVENTION

1. Field of the Invention

This invention relates to data detection, and more particularly, to data detection apparatus which reproduces and detects data subjected to digital recording, for example, on a magnetic recording medium.

2. Description of the Related Art

Data subjected to digital recording on a recording medium, such as a magnetic tape, a magnetic disk or the like, are reproduced (demodulated), for example, by (1) binary-value determination for each bit by integral detection, (2) three-value determination using differential equalization, partial-response (1, 0, −1) equalization, partial-response (1, 1) equalization, or the like, (3) combination of Viterbi decoding, which is a kind of maximum likelihood decoding, and three-value determination.

Since integral equalization is a kind of two-value determination, it is stable against variations in the level of the reproduced output and has a large margin in timing at a detection point. A low-frequency-emphasizing-type waveform equalizer used for integral equalization, partial-response (1, 1) equalization or the like has low high-frequency noise. Low-frequency compensation is unnecessary for differential equalization and partial-response (1, 0, −1) equalization.

Viterbi decoding is a decoding method which efficiently executes maximum likelihood decoding utilizing a repetitive structure of correlative codes, such as convolution codes, partial-response equalization or the like. Viterbi decoding is known to have a low error rate in a decoding operation, and has attracted notice as a means to realize high-density data recording. It has been known that by being combined with a three-value-determination equalization method, such as differential equalization or the like, Viterbi decoding can perform a decoding operation with a lower error rate than a decoding operation for each bit. (Refer, for example, to "The Viterbi Algorithm", Proceeding of IEEE, Vol. 61, No. 3, March, 1973).

Low-frequency-emphasizing-type waveform equalization methods, such as integral equalization, partial-response (1,1) and the like, have the advantage of a relatively large margin in detection timing. However, such a method generally requires low-frequency cut-off, since low-frequency components are emphasized in the noise spectrum in the output of an equalizer. If low-frequency components are cut off at a high frequency, while the S/N ratio is improved, an equalization error caused by low-frequency cut-off distortion increases, and the I-pattern numerical aperture is reduced.

FIG. 1 illustrates a noise-spectrum distribution 100 for integral equalization. FIG. 2 illustrates a recorded waveform 110 and the corresponding integral-equalized waveform 120. In FIGS. 1 and 2, solid lines represent a case in which low-frequency components are not cut off, and broken lines represent a case in which low-frequency components are cut off. As can be understood from FIG. 2, an equalization error Δa is produced when low-frequency components are cut off, since low-frequency components are attenuated. In addition, as can be understood from FIG. 1, when low-frequency components are not cut off, the noise level increases as the frequency is reduced and finally diverges. On the other hand, when low-frequency components are cut off, the S/N ratio is improved since the low-frequency noise is cut off.

Since integral equalization is a kind of binary determination, Viterbi decoding cannot be applied to integral equalization in an unmodified state.

Equalization methods which do not require low-frequency compensation, such as differential equalization, partial response (1, 0, 1) equalization and the like, have a small margin in timing at a detection point, and have greater high-frequency noise than low-frequency-emphasizing-type equalization.

SUMMARY OF THE INVENTION

It is an object of the present invention to provide a data detection apparatus which has a large margin in detection timing and a small error rate.

According to one aspect, the present invention which achieves this objective relates to a data detection apparatus including a low-frequency-emphasizing-type equalizer, an A/D (analog-to-digital) converter for sampling and quantizing the output of the equalizer, a digital filter for performing calculation processing of the output of the A/D converter, and a Viterbi decoder for performing Viterbi decoding of the output of the digital filter. The Viterbi decoder determines branchmetric in consideration of an equalization error.

Since the low-frequency-emphasizing-type equalizer is used, a margin in detection timing is large, and the S/N ratio also has a large value. In addition, since Viterbi decoding is adopted, the error rate in a decoding operation has a small value.

DETAILED DESCRIPTION OF THE PREFERRED EMBODIMENT

A preferred embodiment of the present invention will now be described with reference to the drawings.

Figure 3:
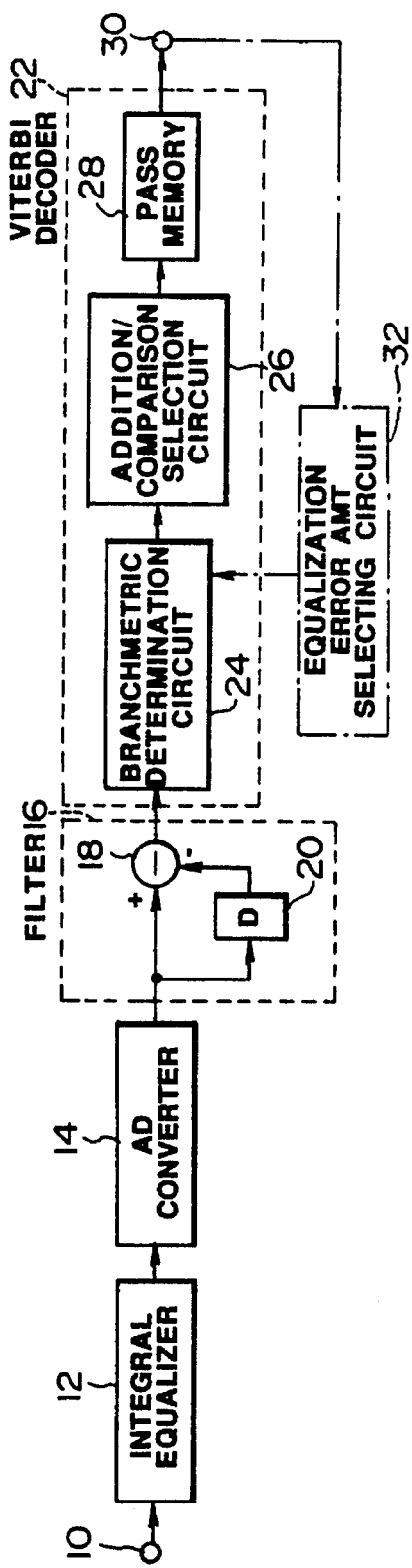
FIG. 3 is a block diagram showing the schematic configuration of an apparatus according to an embodiment of the present invention.

FIG. 3 is a block diagram showing a schematic diagram of an apparatus according to the present embodiment. A reproduced signal (for example, an output from a reproducing amplifier) from a magnetic recording medium is input to input terminal 10. Integral equalizer 12 performs integral equalization. Low-frequency components are cut off at cut-off frequency fc in integral equalization. The output of the equalizer 12 is supplied to an A/D converter 14 to be subjected to sampling and quantization. The output from the A/D converter 14 is supplied to a digital filter 16.

The digital filter 16 includes delay circuit 18 for delaying the output of the A/D converter 14 by a one-bit period, and a subtracter 20 for subtracting the output of the delay circuit 18 from the output of the A/D converter 14. The digital filter 16 converts the supplied signal into a signal equivalent to a signal subjected to differential equalization instead of integral equalization. Accordingly, Viterbi decoding can be applied to the output of the filter 16.

The output of the filter 16 is supplied to a Viterbi decoder 22. The Viterbi decoder 22 includes a branchmetric determination circuit 24, an operation circuit 26 and a pass memory circuit 28. Data decoded by the Viterbi decoder 22 is output to the outside from an output terminal 30.

The configuration and the operation of a Viterbi decoder such as the Viterbi decoder 22 for a signal subjected to differential equalization are well known in the art as described in U.S. Pat. No. 4,606,027 issued Aug. 12, 1986 to S. Otani and in the article by "H. Kobayashi, "Application of Probabilitistic Decoding to Digital Magnetic Recording System", IBM J. Res. Develop. Vol. 15, pages 64–74, January 1971.

The term "branchmetric" indicates ambiguity levels of a change in a state for certain input information. For a general magnetic recording system, branchmetric is expressed by the logarithm of the probability of a change in a state when noise is assumed to have a white Gaussian distribution. That is, $$I(y_k|S_i;S_j) = \ln p(y_k|S_i;S_j) \quad (1),$$

where $S_i$ and $S_j$ represent states, and $y_k$ represents input information including noise.

Figure 1:
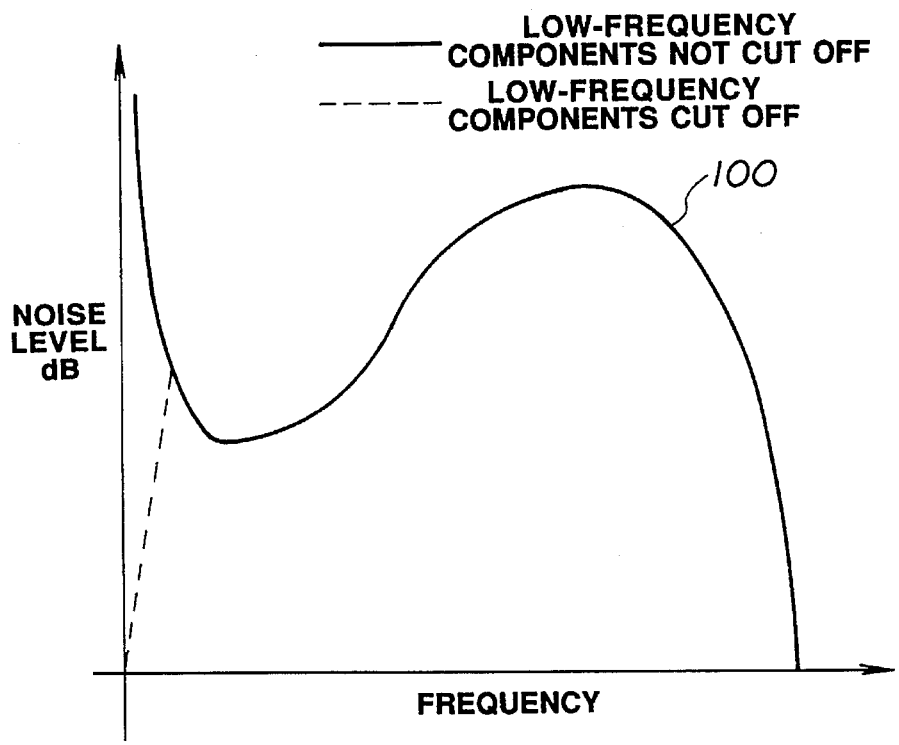
FIG. 1 is a diagram showing a noise-spectrum distribution of integral equalization.
Figure 2:
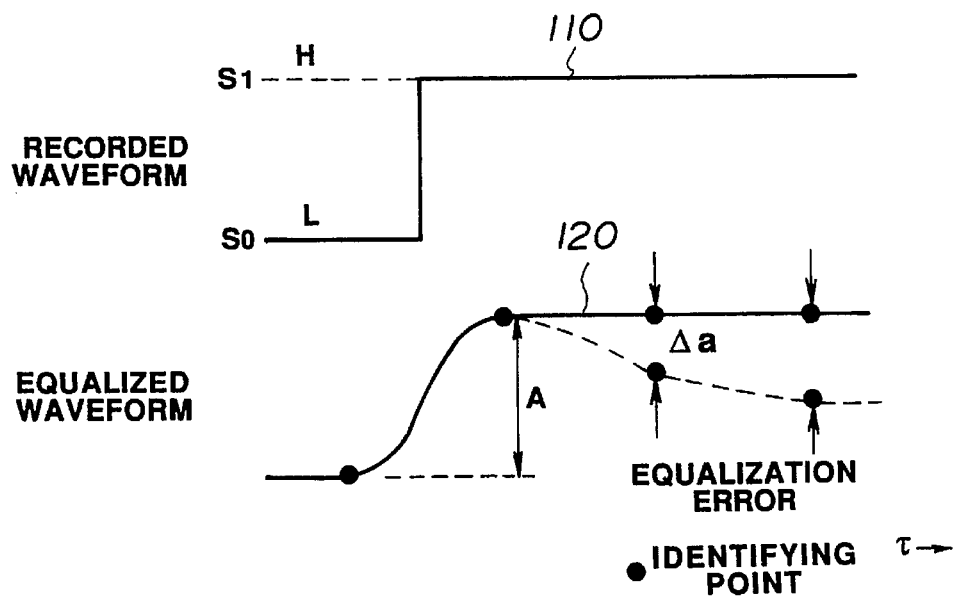
FIG. 2 is a diagram showing a recorded waveform and the corresponding integral-equalized waveform.

Since branchmetric includes a common term for respective changes in states, each branchmetric can be simplified by erasing the common term. According to the above-described literature by H. Kobayashi, if simplified branchmetric is expressed by normalized branchmetric $$\Gamma'(y_k|S_i;S_j) = \ln p(y_k|S_i;S_j),$$

the normalized branchmetric for differential equalization can be determined by the following expressions. That is, $$\left.\begin{array}{l} \Gamma'(y_k|S_0;S_0) = \ln p(y_k|S_1;S_1) = 0 \\ \Gamma'(y_k|S_0;S_1) = y_k - A/2 \\ \Gamma'(y_k|S_1;S_0) = -y_k - A/2, \end{array}\right\} \quad (2)$$

where $S_0$ and $S_1$ represent the states in which the recorded waveform is L (low) and H (high) in FIG. 2, respectively.

A branchmetric determination circuit 24 in the present embodiment adds correction term $a_k$ in consideration of an equalization error and defines branchmetric by the following expressions for a case in which the same state continues. That is, $$\left.\begin{array}{rcl} \Gamma(y_k|S_0;S_0) &=& \ln p(y_k|S_0;S_0) \\ &=& -(y_k - \Delta a)^2 - \ln \sqrt{2\pi\sigma} \\ \Gamma(y_k|S_1;S_1) &=& \ln p(y_k|S_1;S_1) \\ &=& -(y_k + \Delta a)^2 - \ln \sqrt{2\pi\sigma} \\ \Gamma(y_k|S_0;S_1) &=& \ln p(y_k|S_0;S_1) \\ &=& -(y_k - A)^2 - \ln \sqrt{2\pi\sigma} \\ \Gamma(y_k|S_1;S_0) &=& \ln p(y_k|S_1;S_0) \\ &=& -(y_k + A)^2 - \ln \sqrt{2\pi\sigma} \ . \end{array}\right\} \quad (3)$$

The normalized branchmetric is obtained from the following expressions. That is, $$\left.\begin{array}{l} \Gamma'(y_k|S_0;S_0) = a_1 y_k - a_2 \\ \Gamma'(y_k|S_1;S_1) = -a_1 y_k - a_2 \\ \Gamma'(y_k|S_0;S_1) = y_k - A/2 \\ \Gamma'(y_k|S_1;S_0) = -y_k - A/2, \end{array}\right\} \quad (4)$$

where $a_1 = \Delta a/A$, and $a_2 = \Delta a^2/2a$.

Correction terms $a_1$ and $a_2$ are determined from the amount of equalization error $\Delta a$ shown in FIG. 2.

Figure 4:
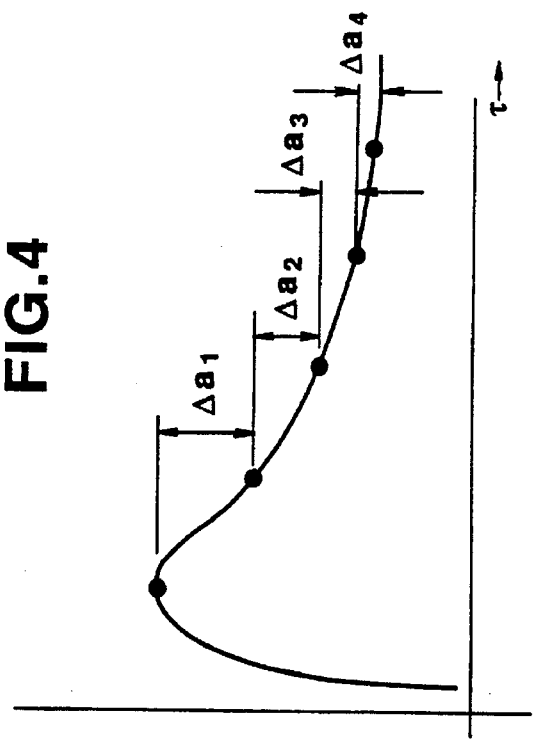
FIG. 4 is an enlarged view of an equalized waveform when the same state continues.

As shown in FIG. 4, the amount of equalization error $\Delta a$ changes with time when the same state continues. Accordingly, an equalization-error-amount setting circuit 32 may determine the expected value of the amount of equalization error $\Delta a$ by linear approximation, or statistical determination in accordance with the frequency of the occurrence of continuation of the same state. Alternatively, the equalization-error-amount setting circuit 32 may statistically process the past history of decoded signals and select the amount of equalization error $\Delta a$ from several values based on the result of the statistical processing.

Expressions (3) are more complicated than expressions (1), causing a burden on the branchmetric determination circuit 24. Actually, however, since the operation circuit 26 has the greatest temporal restriction, the adoption of expressions (3) influences the entire operational speed and the circuit scale less.

The Viterbi decoder 22 determines branchmetric using expressions (3) and (4), and performs Viterbi decoding.

Although the foregoing description has been made illustrating detection of reproduced data from a magnetic recording medium, the present invention may, of couse, be applied to data detection at a reception side in digital data transmission.

As can be easily understood from the foregoing description, according to the present embodiment, equalization having a large margin in timing and an excellent S/N ratio can be performed by cutting off low frequency components at a higher frequency by equalization. Furthermore, by determining branchmetric in consideration of an equalization error caused by low-frequency cut-off, digital information can be detected with a low error rate.

The individual components shown in outline or designated by blocks in the drawings are all well-known in the data detection apparatus arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data detecting apparatus, comprising:
    an integral equalizer for compensating for losses of input signals input from a transmission path through which binary value data are transmitted, to output a signal indicating binary-value data, the integral equalizer emphasizing low frequency components of the input signals and cutting off direct current components of the equalized signal;

sampling means for sampling the output signal of the integral equalizer;

a differential equalizer for performing differential equalization on the sampled signal; and Viterbi decoding means for performing Viterbi decoding of an output signal of the differential equalizer to obtain reproduction data.

2. An apparatus according to claim 1, wherein said Viterbi decoding means comprises:

a branchmetric determination circuit coupled to the output of said differential equalizer;

an operation circuit coupled to the branchmetric circuit; and a pass memory circuit coupled to the operation circuit.

3. An apparatus according to claim 1, wherein said differential equalizer comprises a subtracter and delay means for delaying the sampled signal for a predetermined bit period, wherein said subtracter determines and outputs a difference between an output of said delay means and the output of said sampling means at the predetermined bit period.

4. A data detection apparatus, comprising:

an integral equalizer for equalizing input signals input from a transmission path through which binary value data are transmitted, to output a signal indicating binary-value data, the integral equalizer emphasizing low frequency components and cutting off of direct current components of the equalized signal;

a differential equalizer for performing differential equalization on the output signal of the integral equalizer; and Viterbi decoding means for performing Viterbi decoding of an output signal of the differential equalizer, said Viterbi decoding means performing Viterbi decoding in consideration of an equalization error by the integral equalizer.

5. An apparatus according to claim 4, wherein the Viterbi decoding means includes branchmetric determination means for determining a branchmetric in consideration of the equalization error and pass memory means for holding a state of reproduction data, said branchmetric determination means obtaining the equalization error on the basis of the state of the reproduction data held by said pass memory means.

6. An apparatus according to claim 4, wherein said differential equalizer includes a subtracter coupled to the output of said integral equalizer and a latch circuit coupled between the output of said integral equalizer and the subtracter, and wherein said subtracter determines and outputs a difference between an output of the latch circuit and the output of the integral equalizer at a predetermined bit period.

7. A data detection method comprising the steps of:

compensating for losses of input signals input from a transmission path through which binary value data are transmitted, to output a signal indicating binary-value data in an integral equalizer which emphasizes low frequency components of the input signals and cuts off direct current components of the equalized signal;

sampling the output signal from the integral equalizer;

performing differential equalizing on the sampled signal in a differential equalizer; and performing Viterbi decoding of the output signal of the differential equalizer to obtain reproduction data.

8. A data detector, comprising:

a first equalizer for equalizing input signals input from a transmission path through which binary-value data are transmitted, to output a signal indicating binary-value data, the first equalizer emphasizing low frequency components of the input signals and cutting off direct current components of the equalized signal;

sampling means for sampling the output signal of the first equalizer;

a second equalizer for equalizing an output signal of said sampling means to output a signal indicating n-value data, where n is an integer of three or more; and a Viterbi decoder for performing Viterbi decoding of the output signal of the second equalizer to obtain reproduction data.

9. A data detector according to claim 8, wherein the second equalizer comprises a subtracter and delay means for delaying the sampled signal from the sampling means for a predetermined bit period, wherein the subtracter determines and outputs a difference between an output of the delay means and the sampled signal of the sampling means at the predetermined bit period.

10. A data detecting apparatus, comprising:

an integral equalizer for compensating for losses of input signals input from a transmission path through which binary value data are transmitted, to output a signal indicating binary-value data, the integral equalizer emphasizing low frequency components of the input signals and cutting off direct current components of the equalized signal;

a differential equalizer for performing differential equalization on the output signal of the integral equalizer; and Viterbi decoding means for performing Viterbi decoding of an output signal of the differential equalizer to obtain reproduction data.

* * * * *